US006471886B1

United States Patent
Buffleben et al.

(10) Patent No.: US 6,471,886 B1
(45) Date of Patent: Oct. 29, 2002

(54) ABSORPTION MEDIA FOR IRREVERSIBLY GETTERING THIONYL CHLORIDE

(75) Inventors: George Buffleben, Tracy; Steven H. Goods; Timothy Shepodd, both of Livermore, all of CA (US); David R. Wheeler, Albuquerque, NM (US); LeRoy Whinnery, Jr., Danville, CA (US)

(73) Assignee: Sandia National Laboratories, Livermore, CA (US)

( * ) Notice: Subject to any disclaimer, the term of this patent is extended or adjusted under 35 U.S.C. 154(b) by 33 days.

(21) Appl. No.: 09/698,504

(22) Filed: Oct. 27, 2000

(51) Int. Cl.$^7$ .............................. B01J 20/20; B01J 23/06; C01G 9/02
(52) U.S. Cl. .................... 252/181.6; 502/183; 502/417; 502/424; 423/215.5
(58) Field of Search ............................ 252/181.1, 181.6, 252/181.7; 502/150, 151, 180, 182, 183, 307, 405, 416, 417, 424, 212; 423/245.1, 215.5, 445 R, 447.1, 447.5, 449.2, 622

(56) References Cited

U.S. PATENT DOCUMENTS

| | | | | |
|---|---|---|---|---|
| 4,594,231 A | * | 6/1986 | Nissino et al. | |
| 4,677,096 A | * | 6/1987 | Van der Smisser | |
| 4,917,820 A | * | 4/1990 | Matsumoto et al. | |
| 5,451,249 A | * | 9/1995 | Spiegel et al. | |
| 5,492,882 A | * | 2/1996 | Doughty et al. | |
| 5,909,613 A | * | 6/1999 | Miyoshi et al. | 422/186 |
| 5,948,726 A | * | 9/1999 | Moskovitz et al. | 502/415 |
| 5,955,393 A | * | 9/1999 | Moskovitz et al. | 502/5 |
| 5,997,829 A | * | 12/1999 | Sekine et al. | |
| 6,120,744 A | * | 9/2000 | Teles et al. | 423/99 |
| 6,176,239 B1 | * | 1/2001 | Grove et al. | 128/206.24 |
| 6,344,071 B1 | * | 2/2002 | Smith et al. | |

* cited by examiner

Primary Examiner—Joseph D. Anthony
(74) Attorney, Agent, or Firm—Timothy P. Evans

(57) ABSTRACT

Thionyl chloride is a hazardous and reactive chemical used as the liquid cathode in commercial primary batteries. Contrary to previous thinking, ASZM-TEDA® carbon (Calgon Corporation) reversibly absorbs thionyl chloride. Thus, several candidate materials were examined as irreversible getters for thionyl chloride. The capacity, rate and effect of temperature were also explored. A wide variety of likely materials were investigated through screening experiments focusing on the degree of heat generated by the reaction as well as the material absorption capacity and irreversibility, in order to help narrow the group of possible getter choices. More thorough, quantitative measurements were performed on promising materials. The best performing getter was a mixture of ZnO and ASZM-TEDA® carbon. In this example, the ZnO reacts with thionyl chloride to form $ZnCl_2$ and $SO_2$. The $SO_2$ is then irreversibly gettered by ASZM-TEDA® carbon. This combination of ZnO and carbon has a high capacity, is irreversible and functions effectively above −20° C.

4 Claims, 4 Drawing Sheets

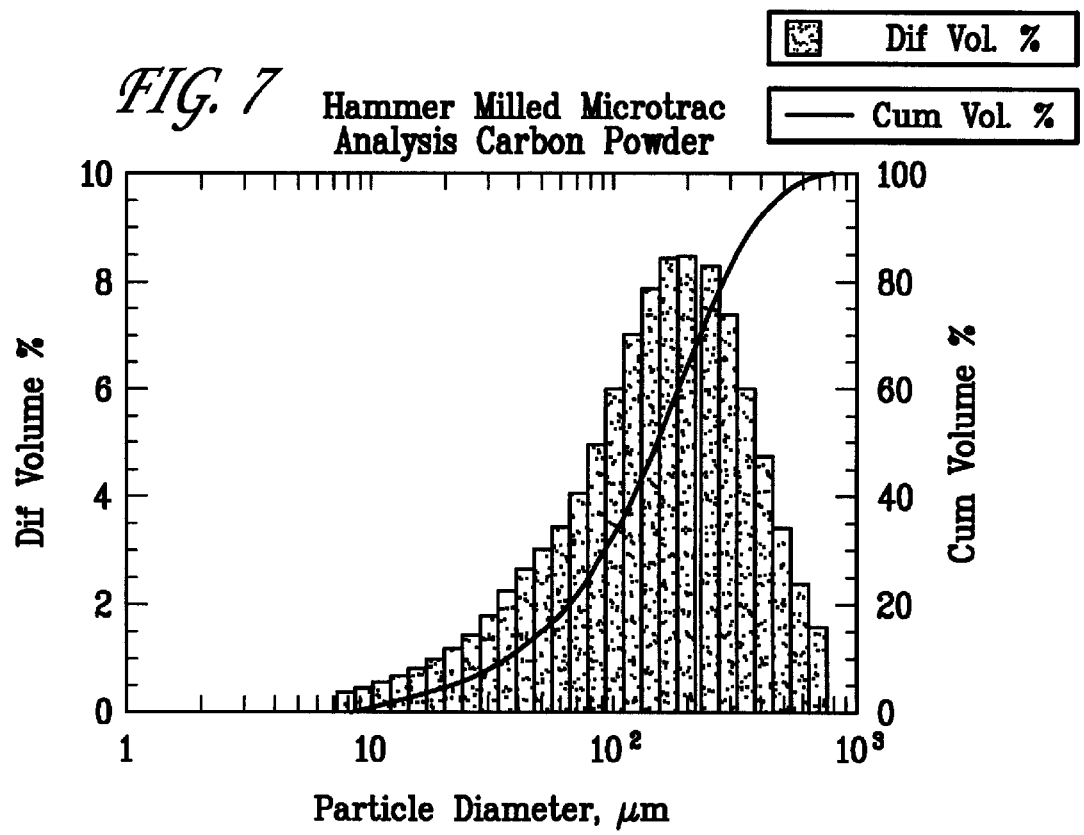
FIG. 7 Hammer Milled Microtrac Analysis Carbon Powder
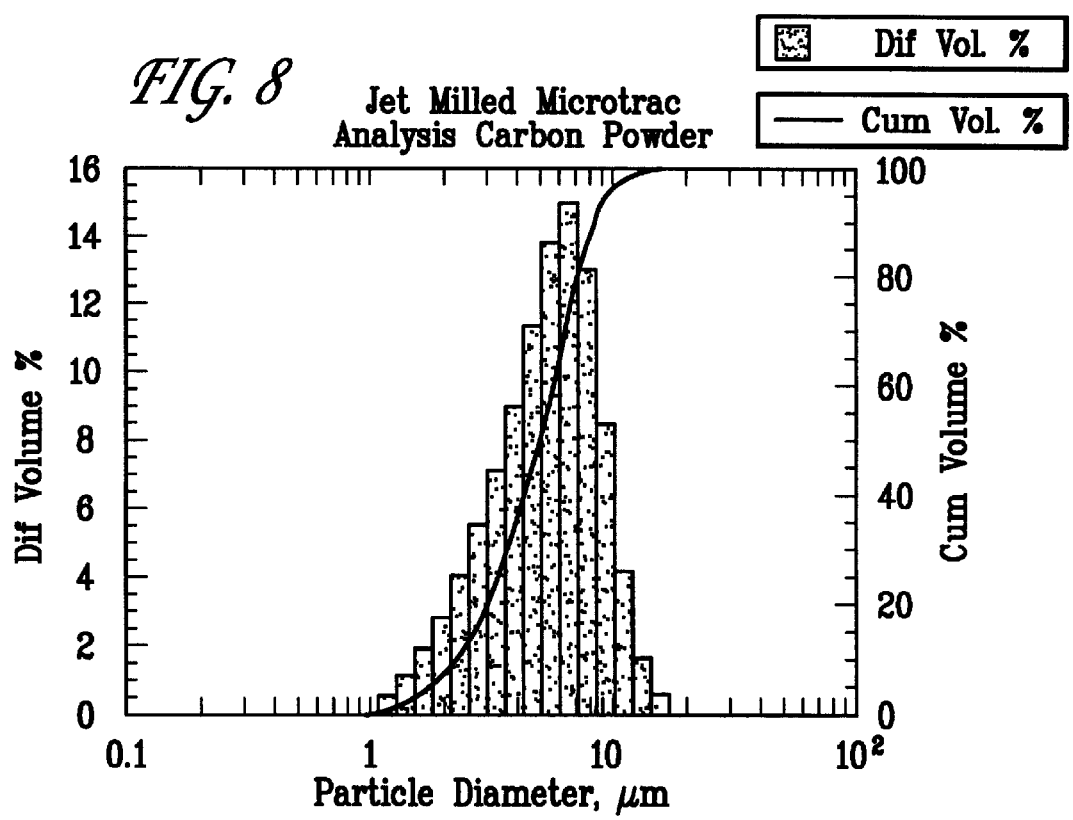
FIG. 8 Jet Milled Microtrac Analysis Carbon Powder

ABSORPTION MEDIA FOR IRREVERSIBLY GETTERING THIONYL CHLORIDE

The United States Government has rights in this invention pursuant to Contract No. DE-AC04-94AL85000 between the United States Department of Energy and the U.S. Department of Energy for the operation of Sandia National Laboratories.

BACKGROUND OF THE INVENTION

1. Field of the Invention

The present invention relates to a new method for irreversibly reacting with, and stabilizing, liquid and gaseous thionyl chloride ($SOCl_2$) and the gaseous decomposition products of thionyl chloride. In particular, the present is drawn to a sorption media for use in surrounding batteries that use liquid thionyl chloride as an active ingredient.

2. Background and Description of Related Art

Thionyl chloride ($SOCl_2$) is a corrosive, fuming, toxic, highly reactive, volatile liquid with a suffocating odor. In spite of these somewhat difficult properties, thionyl chloride is used routinely in the chemical industry in the production of chlorides, acyl chlorides, sulfoxides and many other commodity chemicals. Thionyl chloride is also used as the liquid cathode in numerous designs of commercial lithium primary cells ($Li/SOCl_2$) and batteries, produced mostly for military or other governmental use. While use of thionyl chloride by the chemical industry is centralized, isolated, highly controlled and monitored, its use by battery suppliers necessarily brings people into close proximity with this substance. Since, $Li/SOCl_2$ cells are known to be dangerous if mishandled or abused, the principal concern is to protect people from exposure to $SOCl_2$ which might leak from a battery cell as the result of either corrosion or cell rupture (which may occur due to an electrical short). An average D-size $Li/SOCl_2$ cell can contain several grams of free, liquid $SOCl_2$. "Gettering" the thionyl chloride immediately upon leaking would prevent, or at least greatly minimize, the danger of exposure to these materials. (The term "gettering" is hereinafter used to mean a reaction by a specie with one or more materials, typically at a surface, in which the specie is physically and/or chemically bound to the material and thereby removed from its environment.) It is in protecting people and the sensitive components surrounding the battery, that the present invention finds its widest utility.

Several patents discuss the use of activated carbon and zinc oxide as separate agents for absorbing nocuous gases. U.S. Pat. No. 5,451,249 recites activated carbons and zinc oxide as absorbents for removing hydrogen sulfide, organic sulfur, and halogen compounds from a gas stream in landfills. U.S. Pat. Nos. 5,955,393, 5,948,726, and 5,985,790 all discuss use of activated carbon and zinc oxide are suitable materials for absorbing acid gases. Finally, U.S. Pat. No. 6,120,744 suggests the use of zinc oxide on activated carbon as useful for catalyzing a reaction in the gas phase of methanol in the presence of propyne or propadiene. None of the prior art however, teach that thionyl chloride is irreversibly gettered by the combination of an activated carbon, and particularly a carbon absorbent media produced by Calgon Carbon Corporation under the trade designation ASZM-TEDA®, and zinc oxide powder.

SUMMARY OF THE INVENTION

It is an object of the present invention to provide a combination of materials for irreversibly gettering thionyl chloride and its gaseous decomposition by-products.

It is another object to provide a method for irreversibly gettering thionyl chloride liquid or gas.

Still another object of the invention is to provide a getter system for packaging with sources of thionyl chloride.

The ideal properties of a getter include: irreversible binding with $SOCl_2$, a high volumetric uptake capacity, high efficiency, non-volatile, air stable, insensitivity to atmospheric poisoning, non-toxic, inexpensive, non-corrosive, and the gettering product is not a liquid or oil that could block further flow or accessibility.

In the application at hand, the getter must operate over the temperature range of $-20°$ to $74°$ C. In additional, the getter must be irreversible with respect to thionyl chloride so that the thionyl chloride cannot migrate around the battery compartment and degrade seals or cause corrosion problems. High volumetric uptake capacity is desired because the space available for a getter in a battery compartment is typically extremely limited. Efficiency is desired to minimize corrosion and degradation of mechanical properties, as well as pressure safety issues. In addition, the getter should be non-volatile to prevent migration within the battery compartment, and must be stable in air (since there is air present in the local environment of the battery compartment). Furthermore, poisoning by trace molecular species could present a problem since some materials are known to be reactive with gases such as $CO_2$ present within the local environment. MgO in particular is known to slowly react with $CO_2$ and the metal carbonate formed is unreactive to $SOCl_2$. Finally, a non-toxic getter would make handling and worker exposure easier and less expensive in production. While cost is not an overriding concern, a reasonably priced getter would find more uses in commercial applications. Depending on the flow path for the getter, the physical state of the product may be important. If the gettered product is a thick oil or gel-like material, it could block flow channels preventing further gettering. It is also likely that the getter selected may have use in other commercial applications or storage $Li/SOCl_2$ batteries.

BRIEF DESCRIPTION OF THE DRAWINGS

FIG. 7 illustrates the particle size reduction and distribution from hammer-milling.

FIG. 8 illustrates the improvement in particle size reduction and distribution from jet-milling.

DETAILED DESCRIPTION OF THE INVENTION

Various candidate materials were investigated as potentially useful gettering agents. Since thionyl chloride is quite reactive, a main reaction paths pursued were based on the use of hydroxides and metal oxides. Hydroxides undergo nucleophilic substitution reactions with thionyl chloride producing the corresponding chloride, HCl, and $SO_2$. Hydroxide based gettering systems would also have to getter the HCl and $SO_2$ produced from the initial $SOCl_2$ decomposition. Anhydrous metal chlorides can be prepared by the reaction of thionyl chloride with some metal oxides. This reaction also produces $SO_2$, which would have to be gettered in a complete system.

Included in the list of candidate substances was a granulated carbon material sold by the Calgon Carbon Corporation under the trade name of ASZM-TEDA®. It is an activated carbon impregnated with various metals, metal oxides, and metal complexes incorporated within its structure to irreversibly bind a variety of poisonous gases and airborne toxins, and has been used for several years as a getter for $Li/SOCl_2$ batteries. However, while ASZM-TEDA® carbon can be shown to irreversibly getter $SO_2$, the present applicants have discovered that ASZM-TEDA® carbon will only reversibly getter thionyl chloride. This discovery has lead to a search for a new, more effective getter for $Li/SOCl_2$ batteries.

$SOCl_2$ Gettering

Figure 1:
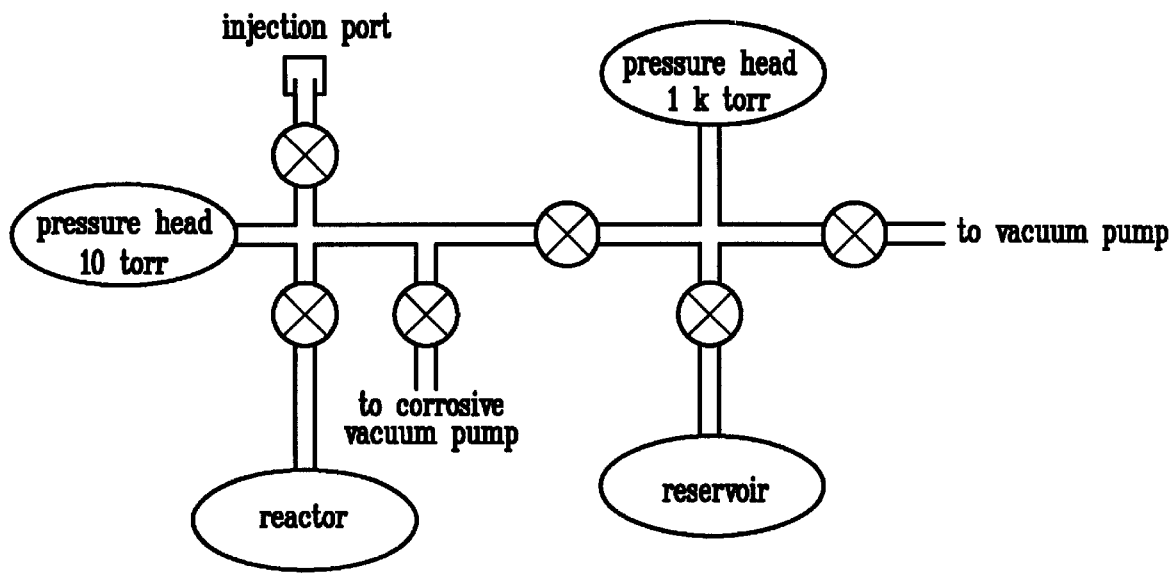
FIG. 1 shows a schematic illustration of the experimental gas uptake manifold.
Figure 2:
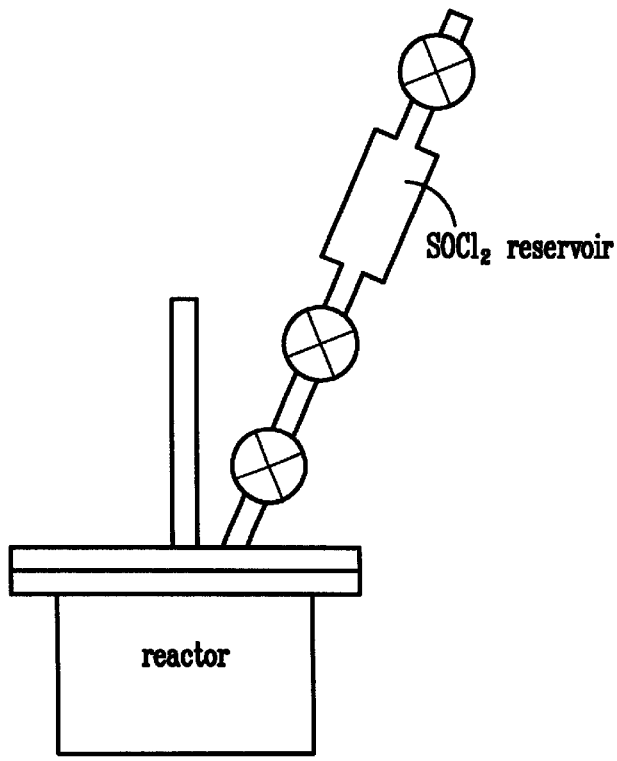
FIG. 2 shows a schematic of the gas uptake apparatus.

In its originally designed application (gas mask filters), ASZM-TEDA® carbon was as an absorption media for use in gas masks and respiratory masks. The carbon was designed to have very high efficiencies for gettering low concentrations of toxic and poisonous gases. However, it was not also required to exhibit high volumetric capacities for those same agents. For several years, ASZM-TEDA® carbon was used as a getter for $Li/SO_2$ and eventually for $Li/SOCl_2$ batteries. The initial approach for developing a getter system for these batteries was to incorporate the carbon into an open-celled structural foam and evaluate the performance tradeoffs. The control experiment (ASZM-TEDA® carbon absorption of $SOCl_2$), to provide the appropriate comparison, revealed that $SOCl_2$ gettering by ASZM-TEDA® carbon was reversible at the capacities required. The reversibility was demonstrated by expansion of the headspace of $SOCl_2$ on ASZM-TEDA® carbon into an evacuated part of the gas manifold described below and shown schematically in FIGS. 1 and 2. The observed pressure recovered to the same level as before the expansion. This observation is consistent with a reversible adsorption/desorption of thionyl chloride on the carbon surface. When the equilibrium is shifted by the expansion (lowering the pressure in the manifold), more thionyl chloride desorbs from the carbon increasing the pressure back to the original value. If the thionyl chloride was irreversibly adsorbed or reacted, the pressure would be expected to decrease and remain at that lower pressure upon expansion. This discovery lead to a search for a new getter for $Li/SOCl_2$ batteries.

Screening Experiments

Due to the time required for the vacuum manifold experiments, screening tests were conducted to evaluate a large number of possible thionyl chloride getters. The highly reactive nature of thionyl chloride affords a plethora of possible gettering materials. Those materials showing promise as getters were examined further in the manifold experiments.

Experiments were conducted to allow faster screening of potential getter materials. These were performed in glass vials open to laboratory air. The getter material under investigation was weighed into the vial and liquid $SOCl_2$ cautiously metered in via syringe. The vial was loosely capped and monitored for heat generation and gas evolution. After allowing the mixture to cool back to room temperature, samples were dosed with additional aliquots of $SOCl_2$. The samples were allowed to react for at least one-day prior to placement in an evacuation chamber to remove and quantify any remaining volatile species.

Manifold Experiments

Gettering characteristics of the candidate materials were evaluated as a function of temperature. The apparatus for testing the getters was designed and built in house as per the schematic in FIGS. 1 and 2. Pressure transducers of 1000 torr and 10 torr MKS made by Baratron were used to monitor the pressure of the system. Temperature and pressure data were acquired during the experiment with a LabView NB-MIO-16XL data acquisition card in a Macintosh IIcx running LabView V3.1.

The sample to be tested was loaded as a loose powder into the reactor and degassed for at least 16 hours at room temperature to a final pressure of less than 1 mTorr. Once degassed, the small (2.0 ml) volume between the reactor and the liquid thionyl chloride reservoir (see FIG. 2) was filled from the reservoir and then added to the reactor and the sample. The temperature at which the uptake reaction occurred was controlled by wrapping the reactor in heating tape for elevated temperatures, or by placing the reactor in a cold bath for low temperatures. The maximum elevated temperature was 74° C. Only one temperature below ambient was examined. In this case, acetonitrile and liquid nitrogen were used to prepare a −44° C. bath. The reversibility of the getter was determined by expanding any over-gas in the reactor into the main reservoir and monitoring the pressure to see if it returned to its previous equilibrium pressure. The over-gas was also sampled through the injection port for GC/MS analysis.

The gettering capacities of several of the candidate chemicals were determined. Two main types of chemistries were explored. The first was to react thionyl chloride with a hydroxyl group. The hydroxyl could be in the form of an alcohol, a carboxylic acid, or a surface hydroxide. Alcohols investigated include polyvinyl alcohol, cellulose and sugars. Alcohols are quite reactive with thionyl chloride. Unfortunately, the alcohols examined here form thick oily residues upon reaction with thionyl chloride. This could cause a problem by sealing off the getter manifold to further thionyl chloride. Polyacrylic acid was removed from consideration for similar reasoning. It was decided that the extent of hydroxyls on a surface would be very hard to quantify in a production environment and was thus removed from consideration. Adsorbed water was not explored as a means of reacting thionyl chloride because of the need to keep the system as dry as possible.

The second chemistry involved metal oxides reacting with thionyl chloride to form metal chlorides. Of the metal oxides considered, MgO had the highest theoretical uptake capacity. Unfortunately, MgO is known to slowly react with $CO_2$ from the atmosphere to form $MgCO_3$, which does not react with thionyl chloride. Polyurethane foams used to encapsulate the batteries are blown with $CO_2$. This $CO_2$ will slowly evolve over time and react with the MgO to diminish its uptake capacity. Thus, MgO was removed from consideration.

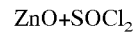
$ZnO+SOCl_2$

Figure 3:
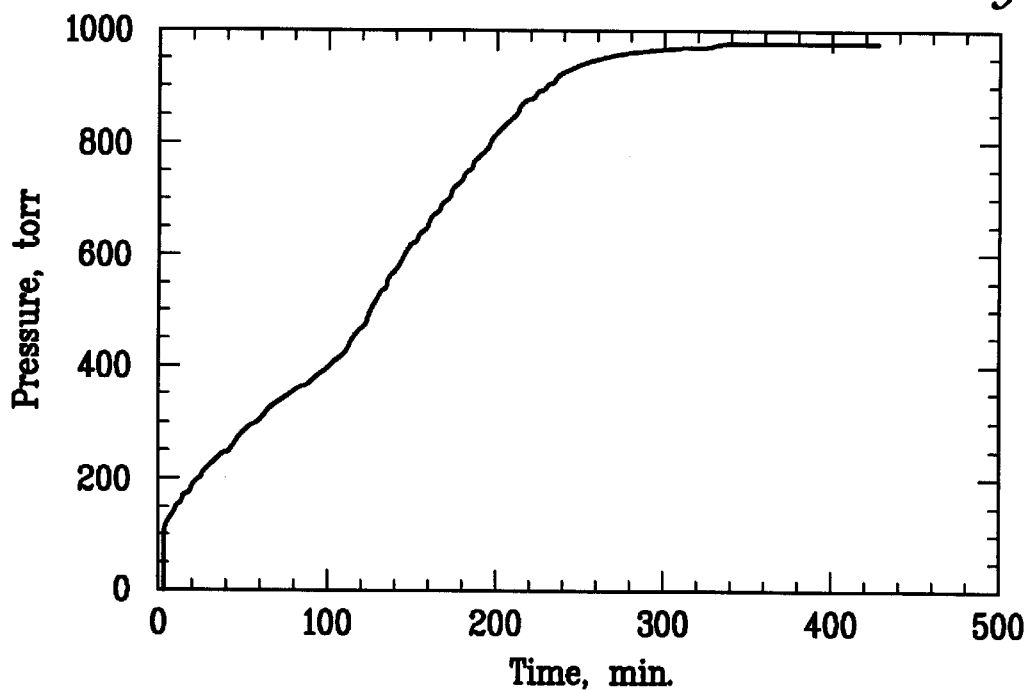
FIG. 3 shows the pressure generated by the $SO_2$ produced when a quantity of thionyl chloride was added to dried zinc oxide at room temperature.

ZnO has almost as high of a theoretical uptake capacity as MgO, but doesn't have the $CO_2$ concerns. Screening experiments with ZnO yielded results that suggested further investigation: modest reaction rates, as indicated by a very slight exotherm and controlled gas evolution were observed. Indeed, in the vacuum manifold apparatus, ZnO was found to react stoichiometrically with thionyl chloride to form $ZnCl_2$ in a controlled reaction as shown in FIG. 3. The origin of the pressure increase observed in FIG. 3 is $SO_2$ as the gaseous product of thionyl chloride decomposition on ZnO. The slight hump in the first 100 minutes of the pressure curve could be due to either a small amount of surface adsorbed water or a higher reactivity on the ZnO surface compared to the bulk. Surface adsorbed water would be expected to react faster than ZnO, produce HCl gas as well as $SO_2$, and be more exothermic. Although the ZnO was oven dried, some small amount of water could remain. However, analysis of the headspace gas with GC/MS showed no HCl, indicating that water was not present at any significant level. Thus, the small hump in the early part of the pressure curve is most likely due to a slightly higher reactivity at the ZnO surface.

Temperature Effects

Figure 4:
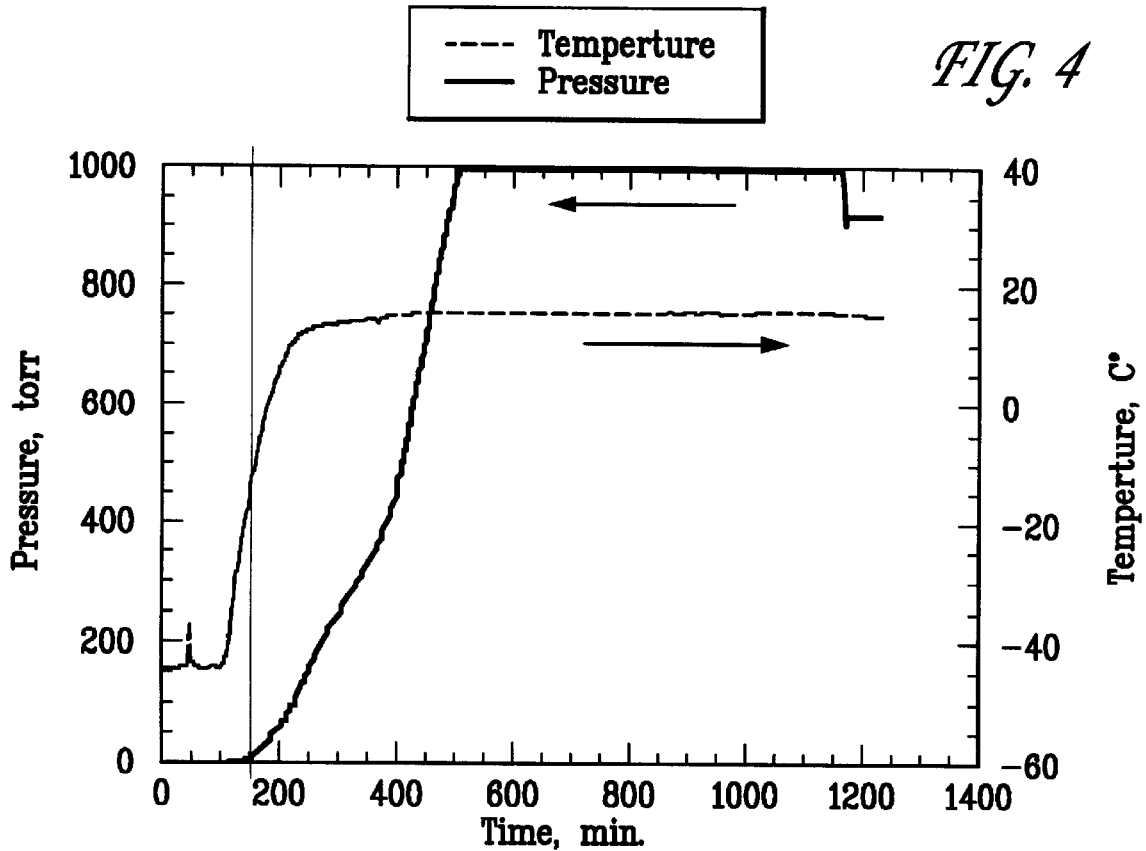
FIG. 4 shows the pressure generated by the $SO_2$ produced when a the thionyl chloride was added to zinc oxide starting at $-44°$ C.

A good thionyl chloride gettering system must be able to operate over a reasonably wide temperature range. In order to determine the effective temperature range for the operability of ZnO, vacuum manifold experiments were conducted at −44° C. and 74° C. The low temperature limit was approached by cooling the reactor to −44° C. prior to adding the thionyl chloride to the zinc oxide. As shown in FIG. 4, no increase in pressure was observed. After approximately 100 minutes, the cold bath was removed and the reactor was allowed to warm to room temperature. As the temperature approached −20° C., the pressure started to increase due to $SO_2$ evolution (indicated by vertical line) suggesting that the zinc oxide powder is kinetically limited and relatively less reactive with respect to thionyl chloride at lower temperature especially below normal ambient temperatures. Fortunately, $Li/SOCl_2$ batteries are less likely to leak at lower temperatures.

Figure 5:
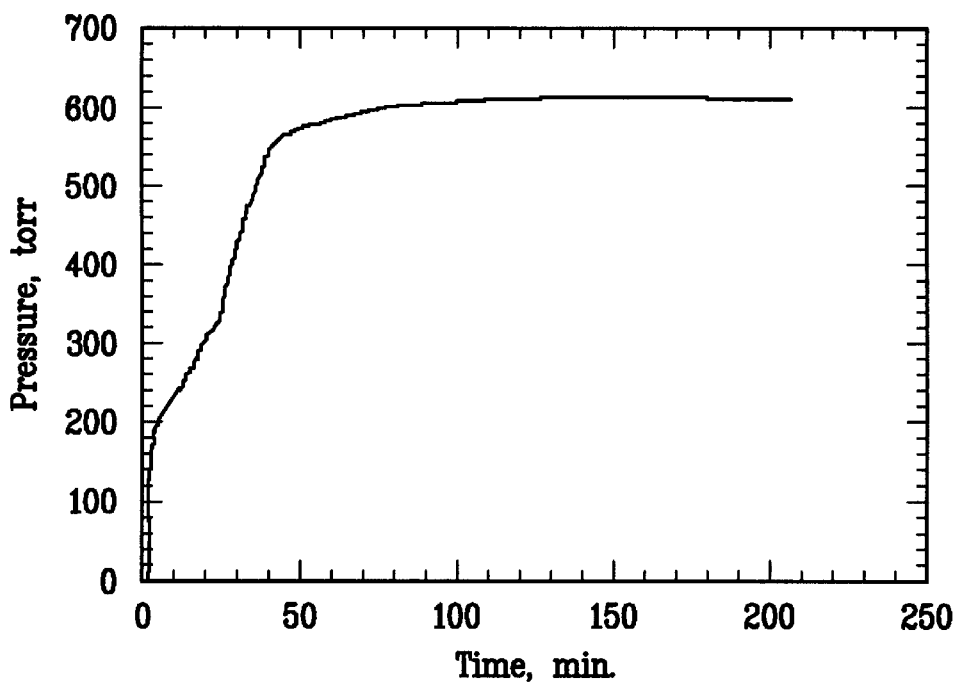
FIG. 5 shows the pressure generated by the $SO_2$ produced when a quantity of thionyl chloride was added to zinc oxide at $74°$ C.

The highest temperature for the application is expected to be approximately 74° C. So, the high temperature evaluation was conducted at 74° C. As shown in FIG. 5, the pressure increases faster than observed in FIG. 3 performed at 25° C.

Figure 6:
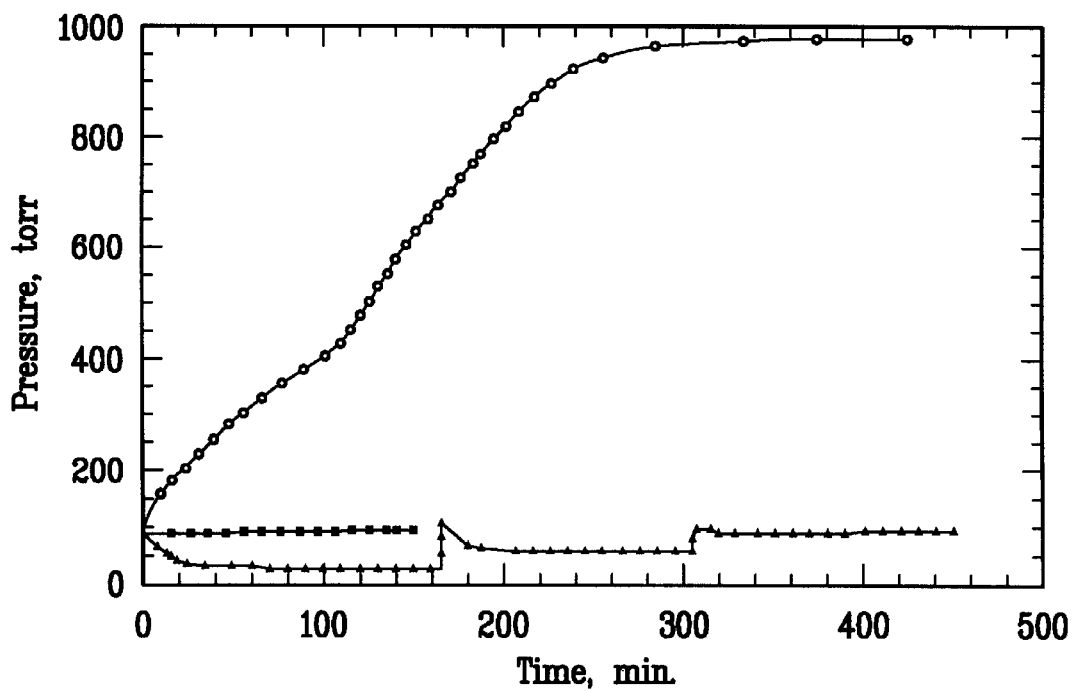
FIG. 6 show the $SOCl_2$ uptake experiments for (a) ZnO only; (b) for ASZM-TEDA® carbon only; and for (c) the combination of ZnO+ASZM-TEDA® carbon.

To this point it has been shown that ZnO reacts cleanly and effectively over the temperature range of interest with $SO_2$ gas produced as a by-product. Although $SO_2$ is much less hazardous to have in a system than $SOCl_2$, it is still considered to be undesirable. Hence, there is a need to getter the $SO_2$ from the local environment. However, since is has been previously and clearly demonstrated that the ASZM-TEDA® carbon effectively getters $SO_2$, this task is considerably easier than trying to find the optimal thionyl chloride getter. As discussed earlier the carbon (ASZM-TEDA®) originally used to getter thionyl chloride was designed to getter $SO_2$. As shown in FIG. 6C, the combination of ZnO with ASZM-TEDA® carbon works quite effectively to getter the thionyl chloride and most of the $SO_2$. FIG. 6C also shows the effect of 3 doses of thionyl chloride on the ZnO/carbon mixture. The stoichiometric amount of thionyl chloride needed to completely react 6.6 g of ZnO is 6.4 g (or two doses of 3.2 g). The third dose is excess and in agreement with the pressures observed in (FIG. 6B), which was previously shown to be reversible. The amount of carbon chosen is related to the total volume available for the getter in a specific application. It may be beneficial, where possible, to use more ASZM-TEDA® carbon to achieve a lower total pressure. The pressure curve for the production of $SO_2$ (FIG. 6A) from $ZnO+SOCl_2$ is included for comparison.

Therefore, it has been successfully demonstrated that a combination of ZnO and ASZM-TEDA® carbon will irreversibly getter $SOCl_2$ by over a modest temperature range. While thionyl chloride decomposition was slow below −20° C., lower temperatures are expected to be less of a problem than at higher temperatures. The approximately 30 cc of thionyl chloride in a typical D-cell would require 50 g of ZnO and 107 g of ASZM-TEDA® carbon.

Particle Size Modifications

As part of the initial plan to incorporate ASZM-TEDA® into the structure of a self-supporting foam, it was necessary to refine the particle size of the "as-received" material. Furthermore, it is necessary to reduce particle size as much as possible to most efficiently utilize the available container volume.

The ASZM-TEDA® carbon was obtained from Calgon Carbon Corporation, Pittsburgh, Pa. and is available in granular form only. The as-received granules were about 1–2 mm in diameter. Since the vendor of the material would only ship the carbon in its native, granular form, particle size reduction was performed under contract with Aveka, Inc., Woodbury, Minn. Two size reductions were undertaken. First, the granular carbon was hammer-milled and the resulting particle size distribution is shown in FIG. 7. The left axis in FIG. 7 indicates the differential volume percent for each particle size. The right axis indicates the cumulative volume percent of the refined carbon powder. FIG. 7 indicates that this initial milling process reduced the mean particle size by about a factor of 10 to approximately 200 $\mu$m.

Jet milling further refined the hammer-milled material and the final particle size distribution is shown in FIG. 8. Jet-milling further reduced the mean particle size by about a factor of 50 to approximately 4 $\mu$m. This sequential milling process was quite efficient. The as received carbon yielded approximately 78% of powder having the size distribution shown in FIG. 8.

The BET surface area of the final jet-milled powder and of the as-received material was performed in order the assess the effect if any of the particle size reduction on particle surface area. The as-received sample was found to have a BET surface area of 640 $m^2/g$. Not withstanding the 500-fold decrease in particle diameter, only a relatively small change in surface area with respect to that originally measured was observed. The final surface area measure was 730 $m^2/g$, about a 15% increase over the surface area of the as-received material.

Reactor System

A system for deploying the above getter material is now described. As noted, the getter is useful as a absorption media in $Li/SOCl_2$ battery packs for preventing release of thionyl chloride into the immediate environment should one or more battery cells fail. Because the material is in powder form one option is to simply pour the getter into the free space between cells within the pack. This, however, has the unintended potential for creating further difficulties by shorting otherwise undamaged cells, should a weak cell fail and discharge a quantity of thionyl chloride liquid into any of the getter (which might have migrated between cell terminals). The media therefore needs to be contained in some manner but still accessible to any thionyl chloride which might be release in the pack.

Such a system is easily provided for by loosely placing the powdered getter into a porous, woven or nonwoven, fabric bag and then sealing the bag. Such materials as a nonwoven polyester mat fabric and the like find utility in this embodiment. Other similar woven and nonwoven synthetic textile materials would be equally effective provided each is porous and wetted by the thionyl chloride.

In addition, the powdered material may be mixed into an open cell polymer foam or aerogel such materials are easily "cast-to-shape" and can be formed into structures fitting around the battery cells.

Finally, while the foregoing has focused on the application of these getters in liquid cathode lithium batteries, it is just as useful in preventing or limiting thionyl chloride release wherever this material is used. This is especially true where large quantities of thionyl chloride are handled and where any release into the environment could present a serious threat to the health and safety of those directly working nearby.

What is claimed is:

1. A system for irreversibly reacting with thionyl chloride, comprising:

an absorption media consisting essentially of zinc oxide and a porous activated carbon, said zinc oxide and said porous activated carbon comprising finely divided powders having average particles sizes below about 20 microns in diameter; and a porous fabric bag for maintaining said absorption media within a predefined volume and for providing substantially unrestricted access for said thionyl chloride to contact at least some portion of said absorption media.

2. The system of claim 1, wherein said thionyl chloride wets said porous fabric bag.

3. The system of claim 1, wherein said porous fabric bag comprises a woven or nonwoven fabric.

4. The system of claim 3, wherein said porous fabric bag further comprises synthetic fibers.

* * * * *